US008406804B2

(12) United States Patent
Ishizu et al.

(10) Patent No.: US 8,406,804 B2
(45) Date of Patent: Mar. 26, 2013

(54) COMMUNICATION TERMINAL DEVICE, COMMUNICATION SYSTEM AND METHOD OF SELECTING BASE STATION THEREOF

(75) Inventors: Kentaro Ishizu, Tokyo (JP); Homare Murakami, Tokyo (JP); Goh Miyamoto, Tokyo (JP); Ha Nguyen Tran, Tokyo (JP); Stanislav Filin, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 306 days.

(21) Appl. No.: 12/622,990

(22) Filed: Nov. 20, 2009

(65) Prior Publication Data

US 2010/0128698 A1 May 27, 2010

(30) Foreign Application Priority Data

Nov. 21, 2008 (JP) ................. 2008-297940

(51) Int. Cl.
*H04B 7/00* (2006.01)
*H04W 4/00* (2009.01)
(52) U.S. Cl. ..................... 455/525; 370/332
(58) Field of Classification Search .............. 455/525; 370/332
See application file for complete search history.

(56) References Cited

U.S. PATENT DOCUMENTS

2006/0099952 A1* 5/2006 Prehofer ............... 455/440
2010/0075677 A1* 3/2010 Wang et al. ............ 455/436

FOREIGN PATENT DOCUMENTS

JP 2008-187688 8/2008
JP 2008-227594 9/2008

OTHER PUBLICATIONS

Internet URL http://www.placeengine.com (searched Oct. 1, 2008).
Jun Rekimoto, Takashi Miyaki, and Takaaki Ishizawa; "Life Tag: WiFi-based Continuous Location Logging for Life Pattern Analysis", 3rd International Symposium Location-and Context-Awareness (LOCA2007), pp. 35-49, 2007.
Internet URL http://www.locky.jp (searched Oct. 1, 2008).
Seigo Ito, Hiroshi Yoshida, and Nobuo Kawaguchi; "Studies on Construction Method for Wide-area Positioning Using Wireless LAN"; Information Processing Society of Japan; PSJ Journal, Special Issue for Mobile Communication and Intelligent Transportation Systems towards the Ubiquitous Era, vol. 47, No. 12, pp. 1-13, 2006.

* cited by examiner

*Primary Examiner* — Kamran Afshar
*Assistant Examiner* — Omoniyi Obayanju
(74) *Attorney, Agent, or Firm* — Sampson & Associates, P.C.

(57) ABSTRACT

To provide a method of selecting an optimal base station for each application when accumulating communication quality in response to an application type for a base station and a communication terminal switches base stations. A communication quality database 31 is prepared by assigning a current location of a communication terminal device, a currently running application program and a communication quality when executing an application program. When making a new connection with a base station, the current application and location is used to select a base station having an optimal communication quality from the communication quality database 31. This mechanism may be provided in the communication terminal device or may be provided as a communication system including a server device.

12 Claims, 8 Drawing Sheets

COMMUNICATION TERMINAL DEVICE, COMMUNICATION SYSTEM AND METHOD OF SELECTING BASE STATION THEREOF

RELATED APPLICATIONS

This application claims priority to Japanese Application 2008-297940 filed on Nov. 21, 2008, the contents of which are incorporated herein by reference in their entirety for all purposes.

TECHNICAL FIELD

The present invention relates to a communication terminal device connected with a wireless communication network, a communication system and a method of selecting a base station in the system or network. In particular the present invention relates to a technique for maintaining preferred communication quality required by an application program executed by the communication terminal device.

BACKGROUND ART

In a wireless communication network including current mobile telephone networks or LAN access networks, during wireless switching of the mobile terminal, the selection of the subsequent connection destination wireless base station is performed with reference to frame error rate or radio-wave intensity. In other words, a method is employed of mechanically selecting base stations having good parameter values related to communication states.

However in this type of wireless communication network, in particular when using packet communication, suitable base stations are not all the same depending on the application type. Different types of applications required different types of communication methods and a wireless base station should be selected on that basis.

Known methods related to the above include a Place Engine (Registered Trademark) (Sony Corporation) as disclosed in Non Patent Documents 1 and 2. This technique is a service which connects GPS location information with access points for a wireless LAN discovered at that point, recording that connection on a map and using access points which can recognize a terminal at an arbitrary location to conversely derive a terminal location.

However this service does not record communication quality of the application and merely uses a map for location designation of a mobile terminal. Consequently the service cannot be applied to selection of a base station in response to the application.

Locky Stumbler disclosed in Non Patent Documents 3 and 4 is a software application for estimating location information using a wireless LAN in the same manner as above. A database is created in a server on a network by accumulating a collection of information regarding GPS location information, access points and radio-wave intensity in order to estimate a location of a mobile terminal using the database. This software does not handle communication quality information for an application and thus cannot be applied to selection of a base station in response to the application.

After preparation of a map using GPS and radio-wave intensity as seen in the above techniques, the technique disclosed in Non Patent Document 1 uses the map to specify a location of a terminal.

The technique disclosed in Non Patent Document 2 relates to a communication control device in a communication system in which a mobile device uses handover with respect to a plurality of base stations. The control device includes information showing the type of application for each mobile device as mobile device information and a resource adjustment unit specifies a base station and a mobile device performing handover based on information showing the type of application.

However this technique has the object of suppressing reduction in communication quality for an overall communication system and does not differ from the above techniques of using throughput to select a base station.

SUMMARY OF THE INVENTION

Technical Problem

All of the previous techniques described above cannot select a suitable wireless base station in response to the type of application and do not suggest a method of providing for the collection, accumulation and analysis of information for realizing such a selection.

The present invention is proposed to solve the above problems in the previous techniques and has the object of providing a method of accumulating communication quality in response to an application in a base station and selecting an optimal base station for each application when a communication terminal device switches between base stations.

Solution to Problem

In order to solve the above problem, the following communication terminal is provided.

The present invention is provided with a communication terminal device including a communication unit enabling connection at least with a wireless communication network and enabling execution of application programs used in communication.

The communication terminal device includes a communication quality information acquisition mechanism which has a connection base station information acquisition unit acquiring identification information for a base station in a connected communication network, an application execution unit performing execution processing of the application program, an application detection unit detecting a type or name of the application program currently running, a communication quality acquisition unit acquiring information regarding communication quality or whether or not communication is enabled in an application program currently running, and a communication quality information recording unit recording a combination of at least identification information for a base station, a type or name of the application program and communication quality information in a communication quality database.

At the same time, the communication terminal device is provided with a base station selection mechanism which, in the same manner as above, has the application execution unit, the application detection unit, and a base station selection unit inputting a type or name of an application program currently running detected by the application detection unit, referring to the communication quality database and selecting identification information for a base station having optimal communication quality information with respect to the currently running application program.

The provision of these two mechanisms enables the communication terminal device to connect with the base station in accordance with the selection from the base station selection mechanism when selecting a connection destination base station.

The communication quality information acquisition mechanism of the communication terminal device may be provided with a location detection unit detecting a current location of the communication terminal device.

With such a configuration, the communication quality information recording unit records information for a location of the communication terminal device in the communication quality database with reference to a combination of identification information for the base station, the type or name of the application program and communication quality information. Furthermore the base station selection mechanism is provided with the location detection unit, and the base station selection unit inputs the current location detected by the location detection unit and the type or name of an application program currently running detected by the application detection unit, refers to the communication quality database and selects identification information for a base station having optimal communication quality information with respect to the currently running application program.

The location detection unit may include a simultaneous detection base station information acquisition unit acquiring identification information for a plurality of base stations capable of simultaneous detection, and a location specification unit specifying a location of the communication terminal device in accordance with pre-prepared distribution information for base stations.

The simultaneous detection base station information acquisition unit may be provided with a configuration of identification information for a base station together measuring a radio-wave intensity of each base station, and the location specification unit measures a location using the radio-wave intensity.

The application detection unit may be provided with a configuration of monitoring packets passing through the communication unit and detecting a type or name of the application program by comparing the packet configuration with a pre-prepared database of packet configurations for each application program.

The present invention provides the following type of communication terminal device. In other words, a communication terminal device includes a communication unit capable of connection to at least a wireless communication network and enabling execution of application programs enabling communication. The communication quality database above is prepared in advance, a base station selection mechanism is provided, and the communication terminal device performs connection operations with a base station in accordance with a selection by the base station selection mechanism when a connection-destination base station is selected.

Another aspect of the present invention provides a communication system. This system includes a communication unit enabling connection at least with a wireless communication network, and is formed from a terminal device enabling execution of application programs used in communication and a server device notifying a connected base station to the terminal device by a communication network.

The terminal device includes a connection base station information acquisition unit acquiring identification information for a base station in a connected communication network, an application execution unit performing execution processing of the application program, an application detection unit detecting a type or name of the application program currently running and a communication quality acquisition unit acquiring information regarding communication quality or whether or not communication is enabled in an application program currently running. A communication quality information transmission mechanism includes a communication quality information transmission unit sending at least various types of information such as identification information for a base station and a type or name of the application program and communication quality information to the server device.

At the same time, the terminal device is provided with a base station reference processing mechanism including an application detection unit, and a base station reference unit sending a type or name of an application program currently running detected by the application detection unit to the server device and receiving from the server device identification information for a base station to be selected.

The server device includes a communication quality information recording mechanism including a communication quality information reception unit receiving various types of information from the communication quality information transmission unit through a communication network and a communication quality information recording unit recording a combination of various types of information in a communication quality database, and a base station response processing mechanism including a base station selection unit inputting information received from the base station reference unit, referring to the communication quality database and selecting identification information for a base station having optimal communication quality information with respect to the currently running application program and a base station response unit sending identification information for the selected base station to the terminal device.

The above system enables the terminal device to connect with a base station in accordance with a selection of server device when a connection destination base station is selected.

The present invention may be configured as the following communication system.

In other words, the communication quality information transmission mechanism is provided with a location detection unit detecting a current location of the communication terminal device. The communication quality information transmission unit sends the location of the communication terminal device to the server device in a combination of identification information for the base station, the type or name of the application program and the communication quality information.

The base station reference processing mechanism is also provided with the location detection unit. The base station reference unit sends the current location detected by the location detection unit and the type or name of the currently running application program detected by the application detection unit to the server device. The base station selection unit in the server device inputs information including the current location, refers to the communication quality database and selects identification information for a base station having optimal communication quality information with respect to the currently running application program.

The location detection unit in the terminal device of the communication system may include a simultaneous detection base station information acquisition unit acquiring identification information for a plurality of base stations capable of simultaneous detection, and a location specification unit specifying a location of the communication terminal device in accordance with pre-prepared distribution information for a base station.

The simultaneous detection base station information acquisition unit may be configured to have identification information for a base station together with measuring a radio-wave intensity of each base station, and the location specification unit may measure a location using the radio-wave intensity.

The application detection unit in the terminal device of the communication system may be configured to monitor packets passing through the communication unit and detect a type or name of the application program by comparing that packet configuration with a pre-prepared database of packet configurations for each application program.

The present invention provides a terminal device including a communication unit capable of connection to at least a wireless communication network and enabling execution of application programs enabling communication. This device includes a base a base station reference processing mechanism, and connection with a base station is performed in accordance with a selection of the base station selection mechanism when a connection-destination base station is selected.

The present invention further provides a selection method for a base station in a communication terminal device including a communication unit enabling connection at least with a wireless communication network and enabling execution of application programs used in communication. The processing method herein has the following steps.

(S10) A step of an application execution unit performing execution processing of the application program.

During the execution processing of the application program, (S11-1) A step of an application detection unit detecting a type or name of the application program currently running.

(S11-2) A step of a location detection unit detecting a current location of the communication terminal device.

(S11-3) A step of a connection base station information acquisition unit acquiring identification information for a base station in a connected communication network.

(S11-4) A step of a communication quality acquisition unit acquiring information regarding communication quality, or whether or not communication is enabled in an application program currently running.

(S11-1-4) Each step may be executed and processed simultaneously or in a suitable sequence.

Thereafter (S12) A step of a communication quality information recording unit recording at least various types of information such as the location of the communication terminal device, identification information for the base station, a type or name of the application program and communication quality information in a communication quality database.

The present invention can prepare a communication quality database using the series of processing steps above.

The method includes the following steps.

(S13) A step of an application execution unit performing execution processing of the application program, During the execution processing of the application program, (S14-1) A step of an application detection unit detecting a type or name of the application program currently running.

(S14-2) A step of a location detection unit detecting a current location of the communication terminal device.

(S14-1-2) Each step may be executed and processed simultaneously or in a suitable sequence.

Thereafter (S15) A step of a base station selection unit inputting the currently detected location and the type or name of the currently executed application program, referring to the prepared communication quality database and selecting identification information for a base station having optimal communication quality information with respect to the currently running application program.

The above series of processing steps enables the communication terminal device to select a connection-destination base station and connect with the base station in accordance with the selection from the base station selection mechanism.

The present invention further provides a selection method for a base station in a communication system including a communication unit enabling connection at least with a wireless communication network, and including a terminal device enabling execution of application programs used in communication and a server device notifying a connected base station to the terminal device by a communication network. The processing method herein has the following steps.

In the terminal device, (S20) A step of an application execution unit performing execution processing of the application program.

During the execution processing of the application program, (S21-1) A step of an application detection unit detecting a type or name of the application program currently running.

(S21-2) A step of a location detection unit detecting a current location of the communication terminal device.

(S21-3) A step of a connection base station information acquisition unit acquiring identification information for a base station in a connected communication network.

(S21-4) A step of a communication quality acquisition unit acquiring information regarding communication quality, or whether or not communication is enabled in an application program currently running.

(S21-1-S21-4) Each step may be executed and processed simultaneously or in a suitable sequence.

Thereafter (S22) A step of a communication quality information transmission unit sending at least various types of information such as the location of the terminal device, identification information for the base station, the type or name of the application program and communication quality information to the server device.

In the server device:

(S23) A step of a communication quality information reception unit receiving various types of information from the communication quality information transmission unit through a communication network, and (S24) A step of a communication quality information recording unit recording a combination of various types of information in a communication quality database.

The present invention can prepare a communication quality database using the series of processing steps above.

The method includes the further following steps.

In the terminal device:

(S25) A step of an application execution unit performing execution processing of the application program.

During the execution processing of the application program, (S26-1) A step of an application detection unit detecting a type or name of the application program currently running.

(S26-2) A step of a location detection unit detecting a current location of the communication terminal device.

(S26-1-S26-2) Each step may be executed and processed simultaneously or in a suitable sequence.

Thereafter (S27) A step of the base station reference unit sending the current detected location and the type or name of the currently running application program detected by the application detection unit to the server device.

In the server device:

(S28) A step of the base station selection unit in the server device inputting information received from the base station reference unit, referring to the communication quality database and selecting identification information for a base station having optimal communication quality information with respect to the currently running application program.

(S29) A step of a base station response unit sending identification information for the selected base station to the terminal device.

(S30) A step of a base station reference unit of the terminal device receiving identification information for the selected base station.

The above series of processing steps enables the terminal device to connect with a base station in accordance with the selection from the server device when a connection destination base station is selected.

The present invention having the above configuration has the following advantageous effects.

In other words, an optimal base station can be selected for communication of a currently running application by acquiring communication quality for each application and storing the information in a database.

In particular, an optimal base station can be selected from the current terminal location and the currently running applications by providing a location detection unit in the communication terminal and storing executed application programs and the communication quality for base stations when connected with those applications in the database.

The database can be provided in a communication terminal device and configured as a single device or the database can be provided in a server device and configured as a communication system.

The latter enables sharing of information for communication quality in a plurality of communication terminals.

DESCRIPTION OF THE PREFERRED EMBODIMENTS

Further aspects of the present invention will be described below making reference to the embodiments as shown in the figures. However the aspects are not limited the following.

Firstly the overall concept of the present invention will be described. The present invention accumulates communication quality for an application experienced by a communication terminal in the local terminal or a server in the network, and when selecting a base station, selection is enabled of an optimal base station for communication with each application.

In particular, when evaluating quality, it is proposed to continue recording the quality level of an application at respective locations for each base station by mapping onto a physical map. In this manner, a terminal can select a base station at which high communication quality can be expected or enable recommendations to individual terminals from the server.

There are known existing methods which are techniques of selecting base stations by focusing on communication quality with a base station, for example by examining radio-wave intensity or throughput. In contrast to these methods, the most distinctive feature of the present invention is that it provides a technique of accumulating communication quality for each application by focusing on the applicability or non-applicability of a communication method for each application.

The description below will describe an Example 1 which is configured as a single communication terminal and an Example 2 which is configured as a communication system formed from a communication terminal and a server device. A configuration which does not use a terminal location is described in Example 3. Although only the configuration necessary for the present invention is provided in the communication terminal described hereafter, it is of course possible to create a communication terminal having other functions.

Example 1

Configuration of Single Communication Terminal

Figure 1:
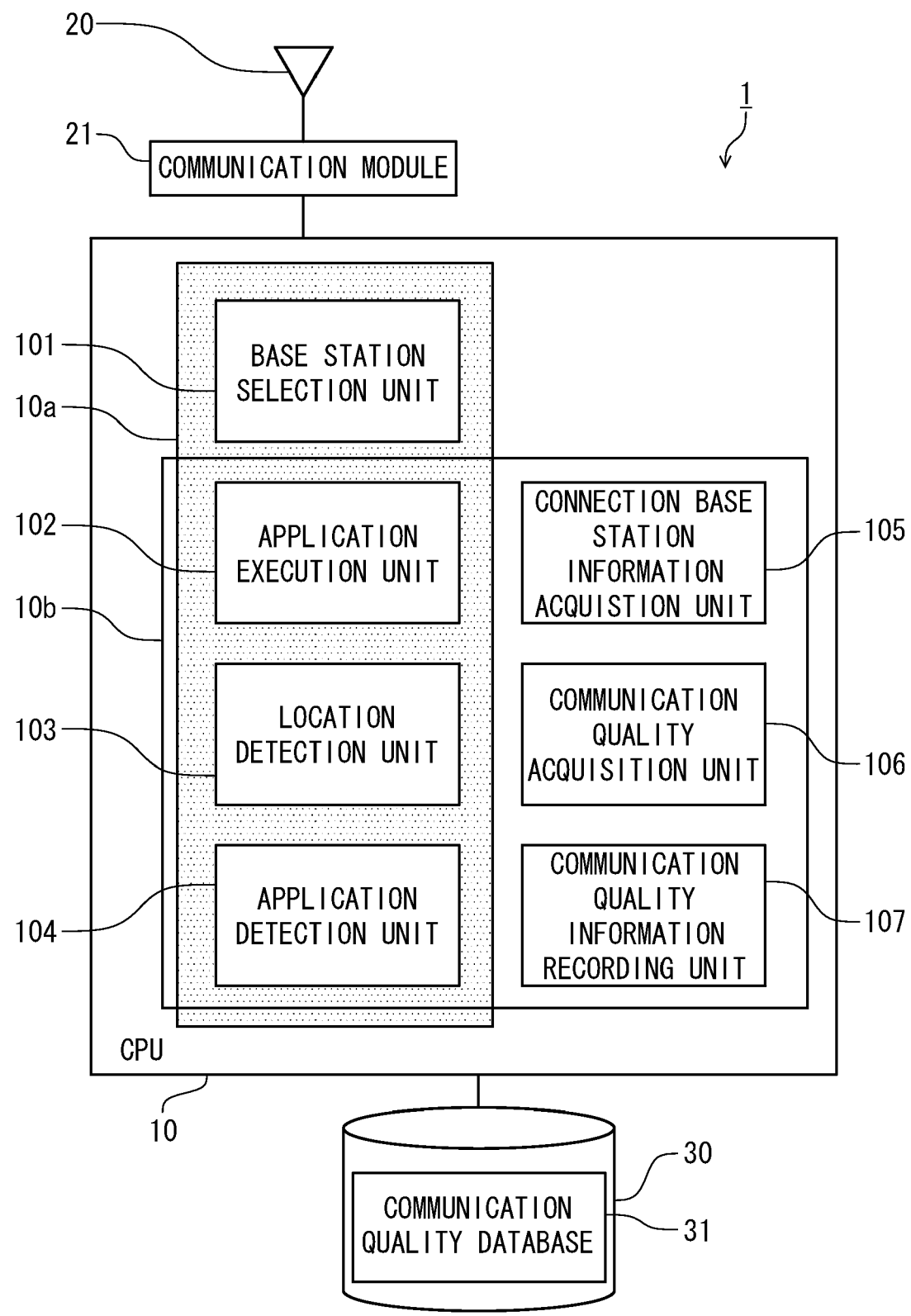
FIG. 1 shows a communication terminal according to a first embodiment of the present invention.

FIG. 1 shows the configuration of a communication terminal (1) according to the present invention. In addition to a known personal computer, the communication terminal (1) may be embodied by any mobile communication terminal such as a mobile telephone terminal or PDA.

The well-known configuration of such terminals includes, in addition to the cooperative operation of a memory (not shown) with a CPU (10) performing calculation processing and the like, a display device such as a monitor and an input device (all not shown) such as a keyboard, mouse and touch panel. Furthermore, an external storage device (30) composed by a hard disk or a flash memory, a communication module (21) and an antenna (20) for communication with a wireless communication network are also provided. A plurality of communication modules may enable communication with a plurality of wireless communication networks.

The communication module (21) is a communication device for connecting with an external network such as a 3G mobile telephone network, PHS, wireless LAN or Bluetooth (registered trademark) and is provided in various forms such as a CF card or PCI card.

A known software modem technique for adapting to a plurality of types of wireless networks may be mounted in the CPU (10) and, in that case, hardware may be shared.

Figure 2:
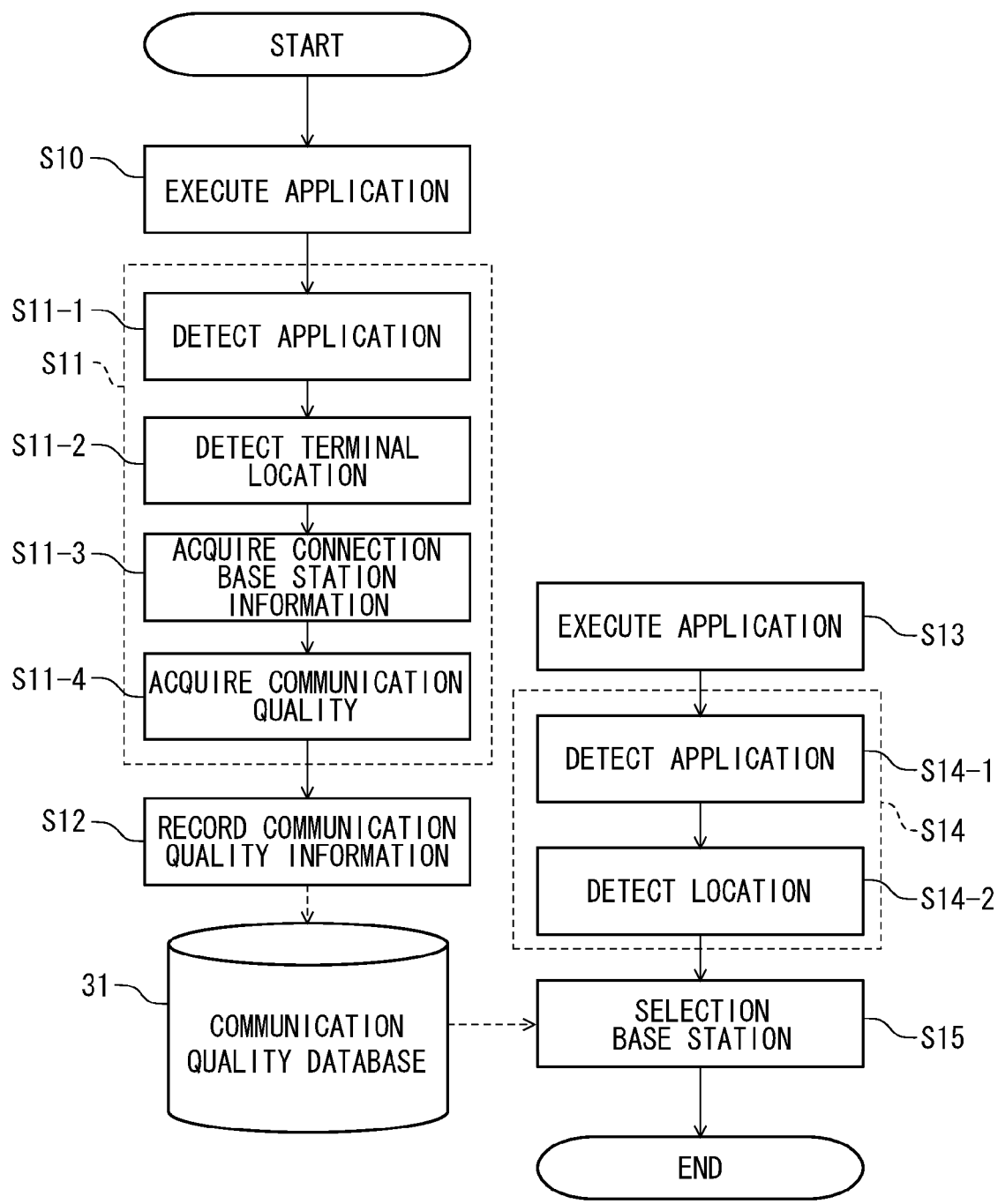
FIG. 2 is a flowchart showing a processing according to the first embodiment of the present invention.

As shown in the flowchart in FIG. 2, the processing performed in the present invention can be divided into a process of preparing a communication quality database (31) (left half of FIG. 2) and a processing of selecting a base station using the prepared database (31) (right half of FIG. 2).

To adapt to executing the latter process, the CPU (10) is provided with the function of a base station selection mechanism (10a) composed of a base station selection unit (101), an application execution unit (102), a location detection unit (103) and an application detection unit (104).

In order to execute the former process, a communication quality information acquisition mechanism (10b) is provided composed of an application execution unit (102), a location detection unit (103), an application detection unit (104), a connection base station information acquisition unit (105), a communication quality acquisition unit (106) and a communication quality information recording unit (107).

As shown in the flowchart in FIG. 2, firstly the application execution unit (102) executes processing of the application program. (Application execution step: S10).

The application program executed by the communication terminal (1) includes not only known web browsers and mail clients, but also voice communication, video communication, video streaming and file transfer. The present invention is applied to applications using communication but of course can be applied to execution of other applications.

Various types of information are acquired when performing communication such as when activating the application or when an arbitrary time point during execution and processing (S11).

Firstly there is a process of acquiring a type or name of the application program currently running by the application detection unit (104) (Application detection step: S11-1).

Secondly there is a process of detecting a current location of the communication terminal device (1) by the location detection unit (103) (Terminal location detection step: S11-2).

Thirdly there is a process of the connection base station information acquisition unit (105) acquiring identification information for a base station in a communication network connected by the communication module (21) (Connection base station information acquisition step: S11-3).

Fourthly, there is a process of the communication quality acquisition unit (106) acquiring current communication quality (Communication quality acquisition step: S11-4).

Each step (S11-1-4) may be executed and processed simultaneously in parallel or sequentially in a suitable order. One part may be executed simultaneously and one part may be executed in order.

The processing performed by the application detection unit (104) will now be described.

The simplest method of specifying the type of application is to acquire the name of the application from a file name or the like when reading the application program. An application type database is provided in the external storage device (30) and the type of application may be specified by referring to the database.

Table 1 is an example of an application type database.

TABLE 1

(Application Type Database)

| Execution File Path | Application Name | Type |
|---|---|---|
| c:¥abc.exe | ABC | Voice Communication |
| c:¥dfe.exe | DEF | File Transfer |

Referring to the database, when the file c:¥abc.exe is executed, the fact that currently a "voice communication" application is being executed can be easily detected.

The present invention can also specify the name or type of an application from the type of packets by monitoring the packets passing through the communication module (21).

In particular, a method of specifying type will be described which is divided into voice communication, video streaming, file transfer or other applications. The present inventors have realized that type of division is required to select perform selection operations taking into account jitter or packet loss for each base station due to the fact that communication quality for an application is not increased by simply increasing the throughput for such applications.

Firstly, voice communication can be detected since it displays an average throughput of less than 32 kbps of the UDP (User Datagram Protocol) packets received by the communication terminal (1). When such a series of packets is detected to the same address which continues for 2 seconds or more, current execution of a voice communication application is detected.

Video streaming can be detected since it displays an average throughput of more than 32 kbps of the UDP packets received by the communication terminal (1). When such a series of packets is detected to the same address which continues for 2 seconds or more, current execution of a video streaming application is detected.

File transfer by downloading or uploading with a given server uses TCP (Transmission Control Protocol) packets which are sent or received by the communication terminal (1). The address port number is any of 80, 21, or 20 and the average throughput is 32 kbps. When such a series of packets is detected to the same address which continues for 5 seconds or more, current execution of a file transfer application is detected.

In other case not falling into the above examples, the application is classified as "other".

These packet configurations are stored as a packet configuration database in the external storage device (30). An example of a packet configuration database is shown in Table 2.

TABLE 2

(Packet Configuration Database)

| Protocol | Average Throughput | Continuous time | Address Port Number | Type |
|---|---|---|---|---|
| UDP | Less than 32 kbps | 2 seconds or more | Undefined | Voice communication |
| UDP | More than 32 kbps | 2 seconds or more | Undefined | Video |
| TCP | More than 32 kbps | 5 seconds or more | 80/20/21 | File transfer |
| undefined | undefined | undefined | Undefined | other |

The detection performed by the application detection unit (104) above may be the name or the type of the application or may be a mixture of both. The details of detection are determined by the requirements of the base station selection unit (101) discussed below and depends on the information which should be stored in the communication quality database (31).

Next, the processing operation performed by the location detection unit (103) will be described.

The simplest method of detecting a location of the communication terminal (1) is to directly measure the latitude and longitude using GPS. For that purpose, the communication terminal (1) is provided with a GPS antenna and a GPS module and must be provided with a unit enabling measurements.

However not all communication terminals are GPS compliant and GPS measurement cannot preferred in view of power consumption and conversion characteristics. Since a relative location with respect to the base station is sufficient for the purposes of the present invention, it is not always necessary to detect a location using GPS to measure latitude and longitude.

In the present invention, a method is proposed which uses PlaceEngine (Non Patent Literature 1 and 2) which was discussed above as a prior-art technique. PlaceEngine infers a terminal location based on a location database of pre-recorded access points from the access points of a recognized wireless LAN and the radio-wave intensity. PlaceEngine proposes a method of seeking a server location specification on a network and a method of inferring location in the terminal. Since these methods are known, they will be described in brief below.

Figure 3:
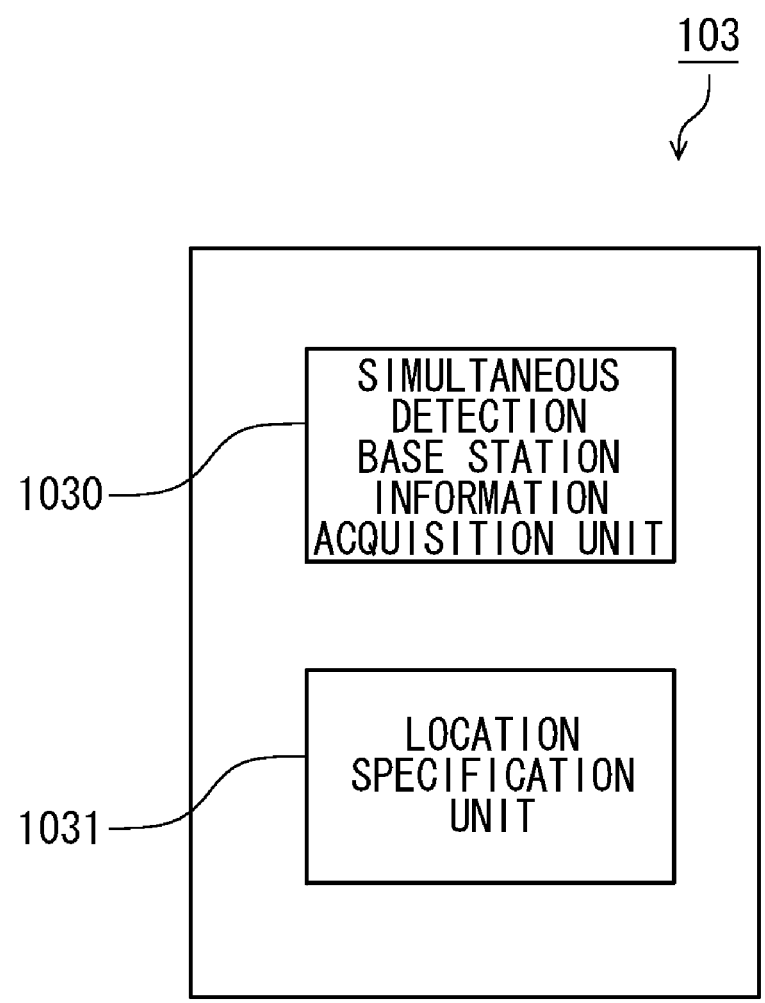
FIG. 3 is an embodiment of a location detection unit according to the present invention.
Figure 4:
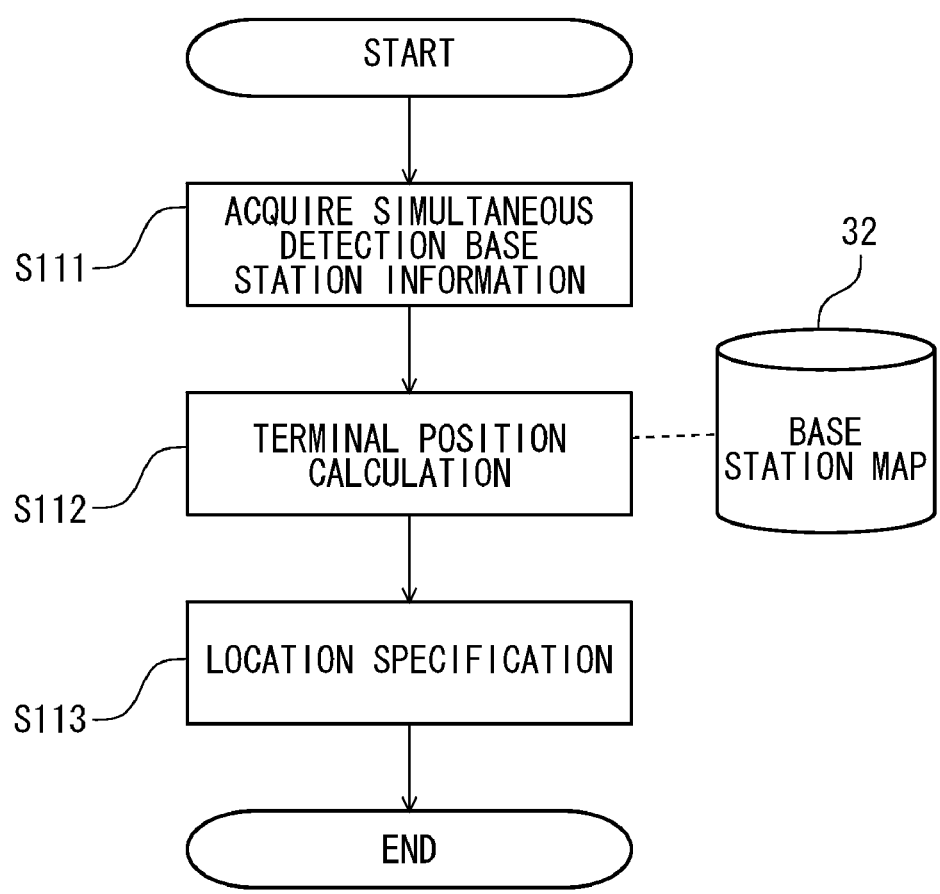
FIG. 4 is a flowchart showing a processing in a location detection unit according to the present invention.

The detailed configuration of a location detection unit (103) is shown in FIG. 3. FIG. 4 shows the detailed processing sequence of a terminal location detection process (S11-2).

In the present configuration, a simultaneous detection base station information acquisition unit (1030) and a location specification unit (1031) are provided. The simultaneous detection base station information acquisition unit (1030) scans base stations with the communication module (21) and the communication terminal (1) acquires a list of base station which are simultaneously detected. The radio-wave intensity (radio field intensity) from each base station may be measured at this time. (Simultaneous detection base station information acquisition step: S111).

Figure 5:
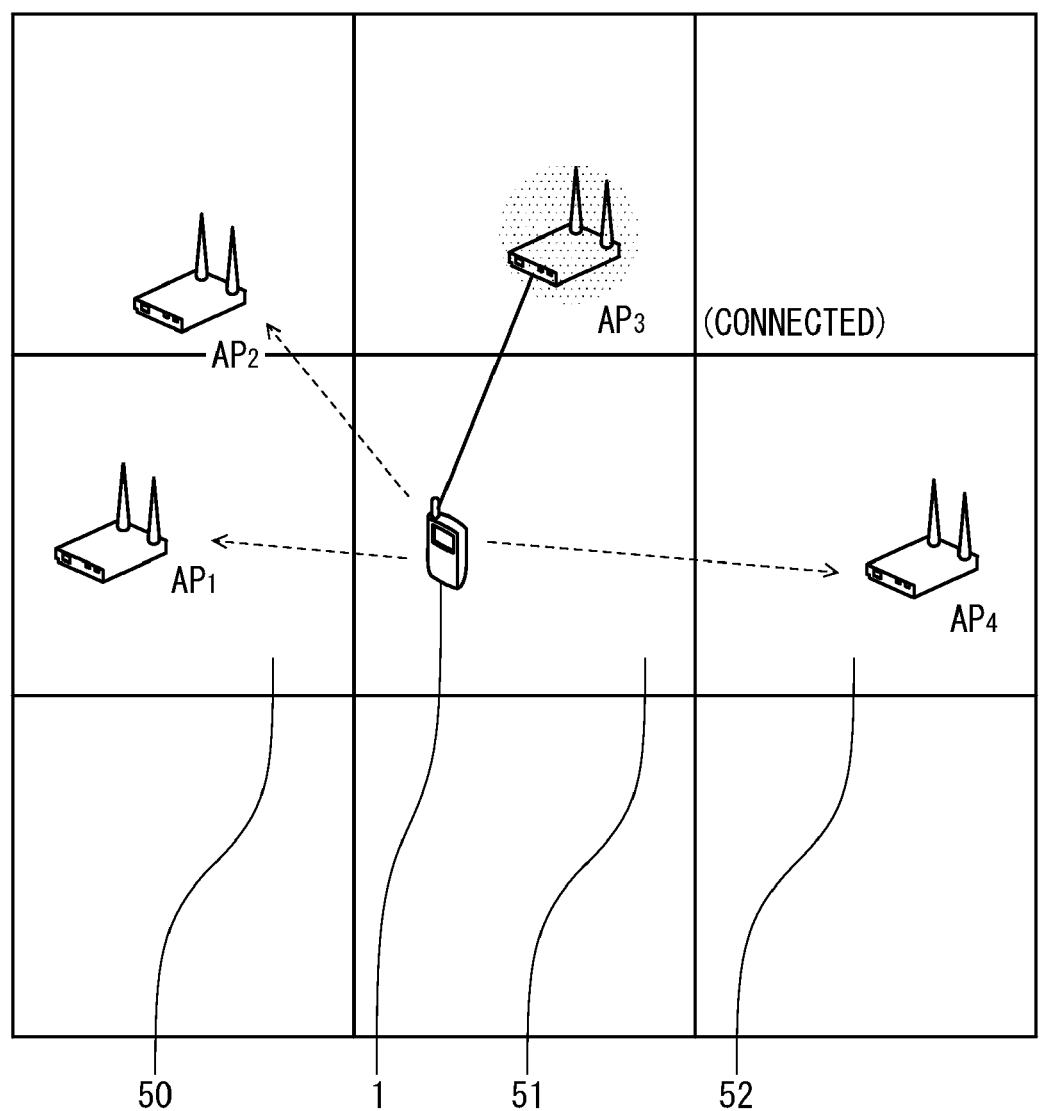
FIG. 5 describes a distribution map of base stations according to the present invention.

As shown in FIG. 5, the communication terminal can receive radio waves from a plurality of base stations AP1-AP4. At that time, when a distribution map for each base station is pre-stored in the external storage device as base station map data (32), the location specification unit (1031) can calculate the location of the communication terminal (1) using triangulation. (Terminal location calculation step: S112).

When radio-wave intensity is not used and for example when all of AP1-AP4 are detected, detection of an intermediate location is enabled. When the output of each base station is the same, the correct location can be detected from the attenuation rate and the ratio field intensity. Even when the output of the base stations is different, if an output of each base station is stored in the base station map data (32), the same calculation can be performed.

Since PlaceEngine provides a latitude and longitude for a base station in the base station map data (32), the location of the communication terminal can be outputted in latitude and longitude.

In the present invention, since it is sufficient to know a general location of the communication terminal, the area is divided into mesh format as shown in FIG. 5 and any area may be outputted. Combination of the above techniques may enable conversion from absolute coordinates (latitude and longitude) to an area. An area may only be used without using absolute coordinates. For example, when AP1-AP4 are detected, if only area (51), and AP1 and AP2 are detected as shown in the figure, area (50) may be outputted, and when only area (50), and AP3 and AP4 are detected, area (52) may be outputted.

In this manner, the location specification unit (1031) may output information regarding latitude and longitude without modification and can output that information as a mesh-formatted area. (Location specification step: S113).

The processing performed by the connection base station information acquisition unit (105) will be described next.

This processing operation may acquire identification information regarding connected base stations. Identification information for a base station may be for example an MAC address, IP address, host name or SSID. Any such information as the unique name of equipment with the manufacturer name of the base station is sufficient as long as the information can be used for identification.

The method of acquisition depends on the identification information but may be acquired simply from the communication module (21) if there is a MAC address or the like. A MAC address is particularly preferred in view of universality and uniformity of data.

The processing of the communication quality acquisition unit (106) will be described next.

In the present invention, the radio-wave intensity of the connected base station and the quality level of the application are measured. The radio-wave intensity is acquired simply by the communication module (21).

The communication quality for each application for voice communication and video streaming is calculated with reference to packet loss and jitter for received packets. Communication quality for file transfer is calculated with reference to received packet throughput.

For other applications, only radio-wave intensity is used.

Although the description above described an example of communication quality focusing on application, the invention is not limited in that regard.

Measured communication quality can be suitably handled for example using a 5-stage absolute measurement value using a suitable method of normalization.

The communication quality information recording unit (107) records communication quality information acquired in processing by the communication quality acquisition unit (106) as a communication quality database. (Communication quality information recording step: S12).

An example of communication quality database is shown in Table 3.

TABLE 3

(Communication Quality Database)

| MAC Address | Area | Type | Jitter | Loss | Throughput | Radio-wave Intensity |
|---|---|---|---|---|---|---|
| 112233445566 | A | Voice | 3 | 4 | | 4 |
| 223344556677 | A | Voice | 4 | 5 | | 3 |
| 112233445566 | A | Video | 2 | 3 | | 4 |
| 112233445566 | A | File transfer | | | 4 | 4 |
| 112233445566 | A | Undefined | | | | 4 |
| 112233445566 | B | Voice | 4 | 5 | | 2 |

As shown in the table, the application type together with the jitter, loss and throughput at that time is calculated and stored for each terminal location and MAC address for each base station. The radio-wave intensity has the same value at the same base station.

When the communication terminal (1) repetitively performs communication with the same type of application and a plurality of values is calculated, the value for each communication quality can be updated using a predetermined statistical method such as averaging.

The division according to application type and automatic division into type as shown above enable flexible application of the database even when a plurality of applications is provided as a result of the type of operating system of the communication terminal (1) or device.

In addition to accumulating information for each type of application, information may be accumulated with respect to precise application names. For example, communication quality for an application name ABC may be accumulated in the database. In this case, although the database may be divided only according to known applications, detailed evaluation based on the characteristics of application is also possible.

By combining the above, frequently used applications can be stored by name in the database and other application may be stored in conjunction with a method of automatically dividing by type.

The communication quality acquisition unit (106) is not limited to the calculation values above and may evaluate communication quality as simply communication possible or not possible. For example, when communication by voice communication has been established, a value of 1 may be accumulated and when not established, a value of 0 may be accumulated.

The processing to this point is a series of processes for the preparation of a communication quality database (31).

The object of preparing such as communication quality database may be to provide a communication terminal provided only with a communication quality information acquisition mechanism (10b).

Next, the process of selecting a base station using the communication quality database (31) will be described. As shown in the right-side process in FIG. 2, firstly the application execution unit (102) executes an application program. (Application execution step: S13).

Then the application detection unit (104) performs an application detection process (Application detection step: S14-1).

The location detection unit (103) detects the location of the communication terminal (1) (Location detection step: S14-2).

Up to this point, each processing step is the same as those described above. The processing unit may be shared as shown in FIG. 1, or may be separately provided. For example, GSP may be used for the location detection unit of the prior processing and location detection using a wireless LAN may be used as the location detection unit for the present processing.

The application detection step (S14-1) and the location detection step (S14-2) may be a process (S14) enabling processing at the same time or in a suitable sequence.

In the present invention, the base station selection unit (101) selects a base station. (Base station selection step: S15).

The timing for selection of the base station is arbitrary and may be performed by a periodical selection process (S15) or a selection process (S15) may be performed when detecting a reduction in communication quality in the communication terminal (1).

Although the selection algorithm for an optimal base station is arbitrary, two preferred embodiments are shown.

A first algorithm uses information for the area in which the communication terminal is presented located of the information in the communication quality database (31). Information related to the application type used by the terminal is searched and a quality level and MAC address for the relevant base station are acquired.

Then an access point having an optimal quality level is selected.

More precisely, when the communication terminal (1) is currently in area A and a voice communication application is running, base stations in the first and second rows of Table 3 are extracted. A quality level having an MAC address of 112233445566 has an average value of 3.5 averaged from a jitter value of 3 and a loss value of 4. The address 223344556677 has an average value of 4.5 averaged from a jitter value of 4 and a loss value of 5.

The latter is selected on this basis. A weighting may be applied to quality type such as jitter or loss or evaluation performed using a predetermined calculation formula. Radio-wave intensity may also be added and a selection condition such as "radio-wave intensity of 3 or more" may be applied.

The second algorithm searches information for application type used by the communication terminal (1) of the information in the communication quality database (31) and a quality level and MAC address for the relevant base station are extracted. The area with the largest quality level for each base station is searched and that area is designated as the base station location.

The base station which is located nearest to the communication terminal (1) is selected.

More precisely, rows 1, 2, 6 of Table 3 from the voice communication applications are extracted. When rows 1 and 6 are compared, if the same base station is measured in area A, jitter and loss take values of 3 and 4 respectively. In contrast, when measured in area B, jitter and loss take values of 4 and 5 respectively. In this basis, the base station is inferred to be present in area B which has good measurement results.

Since the second row only records area A, in the same manner, it is inferred that the current location is area A.

When the communication terminal (1) is in area B, the base station having a MAC address 112233445566 is selected and when in area A, the base station with the MAC address 223344556677 is selected.

If it is assumed that a plurality of base stations is found in the same area, connection may be performed with the base station having the highest quality level of those base stations.

Selection of a base station may be performed using an arbitrary selection algorithm and the communication module (21) may establish connection in accordance with those results.

The method of the present invention can be applied to the first establishment of a link or to the handover of a connected base station. Furthermore the method of the present invention can be used for selection of all or a part of base stations even for communication using link aggregation which uses a link with a plurality of base stations at the same time.

Example 2

Configuration of Communication System

Figure 6:
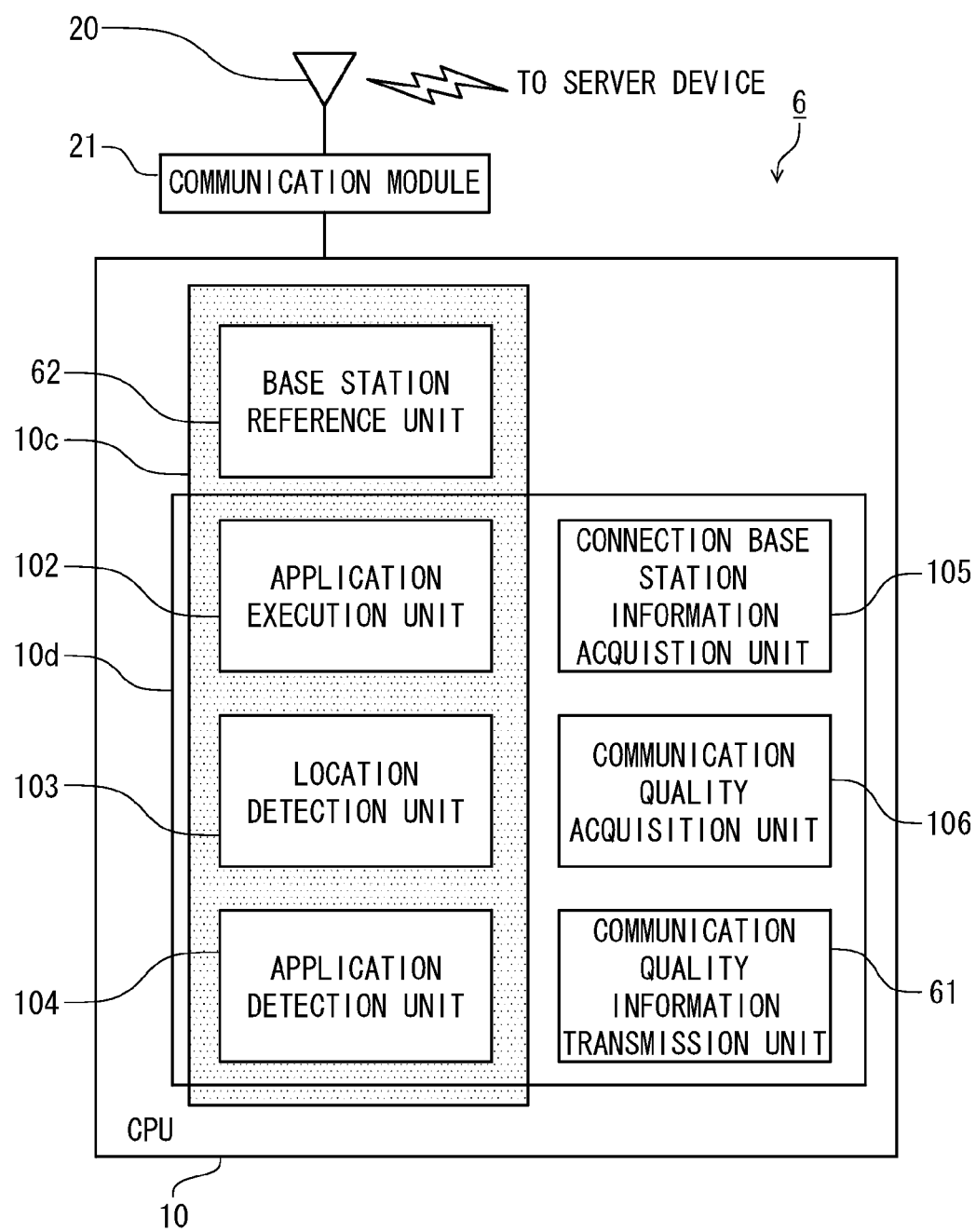
FIG. 6 shows a communication terminal according to a second embodiment of the present invention.
Figure 7:
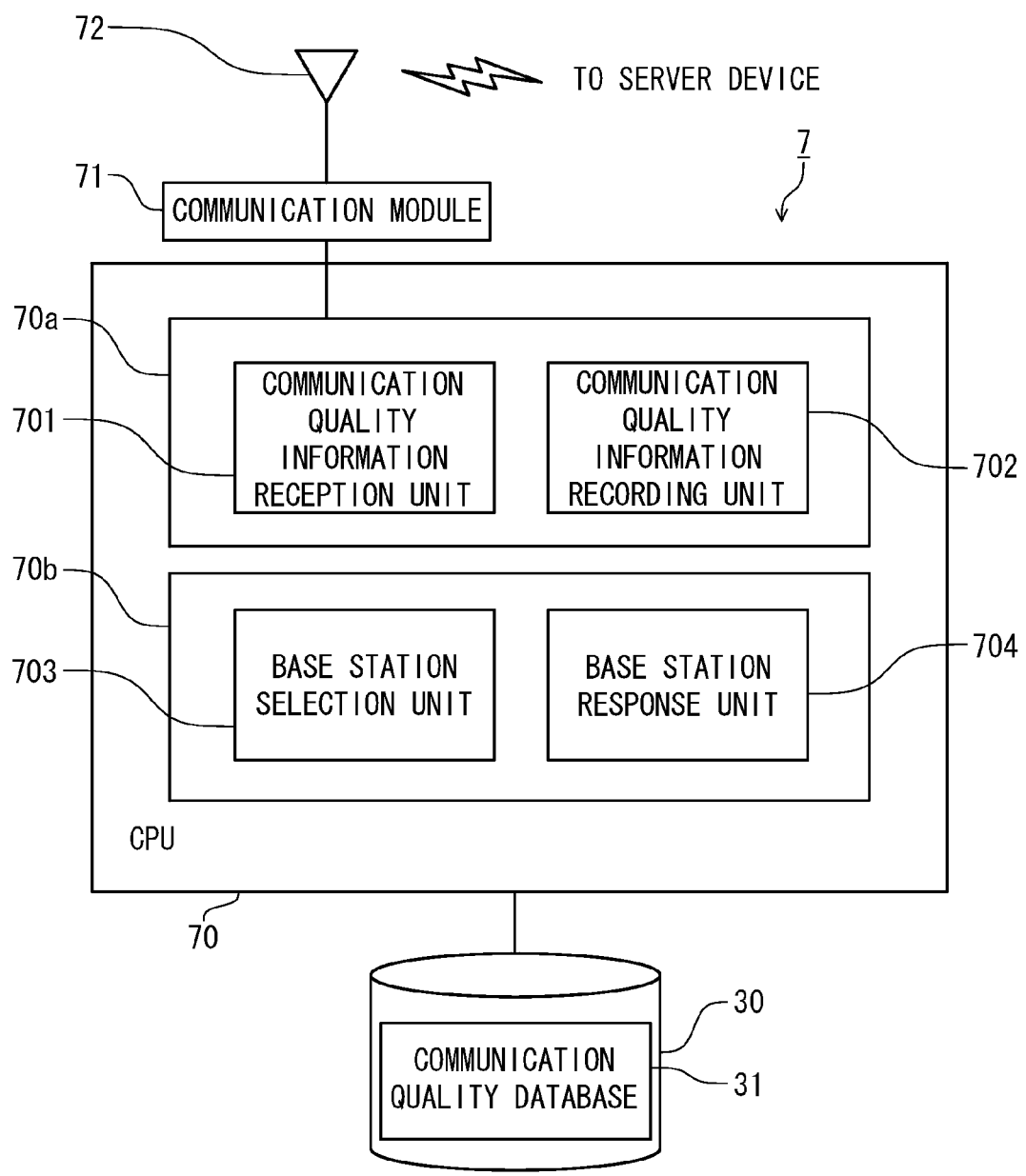
FIG. 7 shows a server according to the second embodiment of the present invention.

The present invention also provides a communication system composed of a communication terminal (6) and a server (7) as shown in FIG. 6 and FIG. 7.

This system is characterized by using a communication terminal (6) to acquire communication quality information or execute application in the same manner as above and use a server (7) to accumulate a communication quality database (31) and select a base station.

As shown in FIG. 6, a communication quality information transmission mechanism (10c) of the communication terminal (6) includes an application execution unit (102), a location detection unit (103), an application detection unit (104), a connection base station information acquisition unit (105), a communication quality acquisition unit (106), and a communication quality information transmission unit (61) sending various types of information including a terminal device location, identification information for the connected base station, a name or type of the application and communication quality information to a server device (7).

Those processing units of the communication terminal (6) which have the same reference number as Example 1 are configured in the same manner and additional description will be omitted. The steps (S10), (S11) in FIG. 2 correspond to (S20), (S21) in FIG. 8 and the steps (S13), (S14) correspond to the step (S25), (S26).

The timing for sending information by the communication quality information transmission unit (61) may be performed when acquiring communication quality information, or after accumulation in the external storage device of the communication terminal (6) in the same manner as the communication quality database (31), and transmission may be performed under predetermined conditions. (Communication quality information transmission step: S22).

The server (7) is provided with an antenna (72) and a communication module (71) to enable communication with the communication terminal (6). The communication quality information recording mechanism (70a) includes a communication quality information reception unit (701) receiving various types of information from the communication quality information transmission unit (61) (communication quality information reception step: S23) and a communication quality information recording unit (702) recording a combination of such information in the communication quality database (31) (Communication quality information recording step: S24).

In this manner, a communication quality database (31) is accumulated in the server (7) in the same manner as Example 1.

Next the right side process in FIG. 8 will be described.

A base station reference processing unit (10d) of the communication terminal (6) includes an application execution unit (102), a location detection unit (103), an application detection unit (104), and a server device (7) sending a current detected location and a type or name of the currently running application program to the server device (7). A base station reference unit (62) is provided to receive identification information from the server device (7) for a base station to be selected.

Under a condition such as a reduction in communication quality, the base station reference unit (62) sends a base station reference message to the server (7). The message includes information such as the current location and the application program type. (Base station reference step: S27).

After reception of this information, the server (7) selects an optimal base station using an algorithm in the same manner as the base station selection unit (101) in Example 1 based on the information received by the base station selection unit (703) of the base station response processing mechanism (70b). (Base station selection step: S28).

The base station response unit (704) of the base station response processing mechanism (70b) sends this result to the communication terminal (6). (Base station response step: S29).

Upon reception of this information by the base station reference unit (62) (Selection base station information reception step: S30), the control routine is completed by connection with that base station.

In this manner, the provision of a communication quality database (31) in the server (7) enables the shared use of the database (31) by a plurality of communication terminals and increases the information amount and the speed compilation of the database.

The connection route for the connection terminal (6) with the server (7) is not limited to a wireless network and may be connected using an arbitrary network. It is preferred that the server (7) is disposed on the Internet and connected through the Internet from the communication terminal (7).

Example 3

Configuration not Using Location Information for Terminal

Preferred embodiments of the present invention which are configurations using current location information for the communication terminal (1), (6) were described in Example 1 and Example 2.

The most distinguishing feature of the present invention is the selection of a base station based on communication quality information for each application without a necessary requirement for using location information with respect to the terminal.

Figure 8:
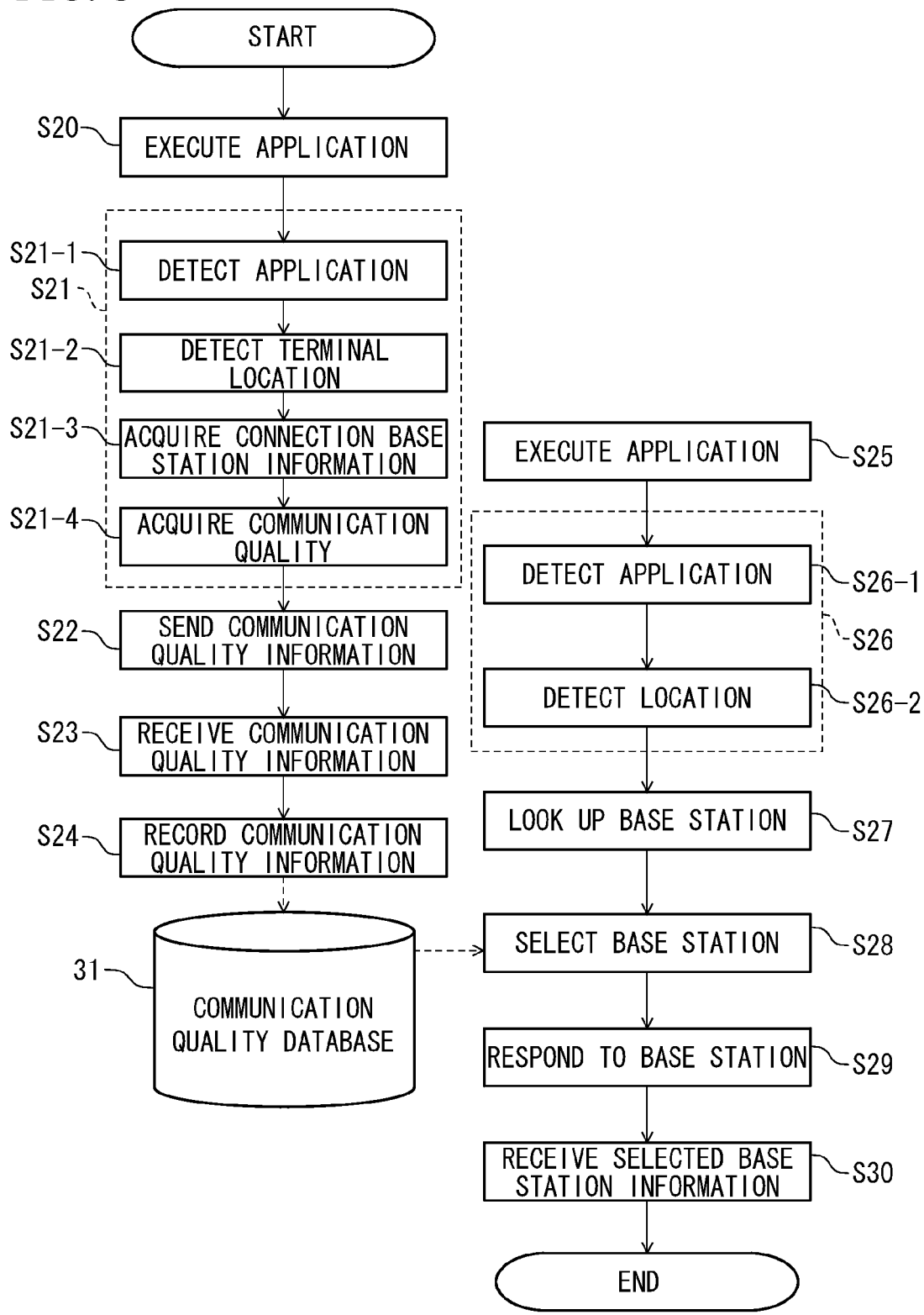
FIG. 8 is a flowchart showing a processing according to the second embodiment of the present invention.

In other words, it is possible to omit the processing in the terminal location detection steps in (S11-2), (S14-2) (S21-2) (S26-2) as shown in FIG. 2 and FIG. 8 and not provide the location detection unit (103) shown in FIG. 1 and FIG. 6. As a result, location information is not included in the communication quality database (31).

In this configuration, the terminal location conditions in the base station selection processes in (S15), (S28) are not applied and when an application is detected (S14-1) (S26-1), the name or type of the application is looked up in the communication quality database (31) and the base station with the highest quality is selected.

When the location of the communication terminal is not fixed, or in an environment in which base stations capable of communication are identified in advance, this configuration of the present example enables effective selection of a base station. Furthermore after selection of the base station, connection may be attempted and in the event of connection failure, selection of the next candidate may be performed.

It is further possible to scan base stations capable of communication with the communication module (21) and select a base station from the resulting list of base stations. In this case, it is preferred that the configuration in Example 2 sends the base station list to the server (7) in the base station reference process (S27).

In a configuration in which a communication system is formed from a communication terminal (6) and a server (7), information including location information is accumulated in the communication quality database (31). In a communication terminal (6) provided with a location detection unit (103), selection of a base station includes location information and when the communication terminal (6) is not provided with a location detection unit (103), selection of the base station is performed using the currently running application.

The present invention can be applied as a device or a method for selecting a wireless base station when varying a use condition of an application with a terminal or when a communication terminal migrates between wireless base stations and has a function of connecting with wireless base stations in a so-called wireless network including wireless LAN access networks or mobile telephone networks.

| | Reference Signs List |
|---|---|
| 1 | COMMUNICATION TERMINAL |
| 10 | CPU |
| 10a | BASE STATION SELECTION MECHANISM |
| 10b | COMMUNICATION QUALITY INFORMATION ACQUISITION MECHANISM |
| 101 | BASE STATION SELECTION UNIT |
| 102 | APPLICATION EXECUTION UNIT |
| 103 | LOCATION DETECTION UNIT |
| 104 | APPLICATION DETECTION UNIT |
| 105 | CONNECTION BASE STATION INFORMATION ACQUISITION UNIT |
| 106 | COMMUNICATION QUALITY ACQUISITION UNIT |
| 107 | COMMUNICATION QUALITY INFORMATION RECORDING UNIT |
| 20 | ANTENNA |
| 21 | COMMUNICATION MODULE |
| 30 | EXTERNAL STORAGE DEVICE |
| 31 | COMMUNICATION QUALITY DATABASE |

CITATION LIST

Patent Literature

1. Japanese Patent Application Laid-Open No. 2008-227594
2. Japanese Patent Application Laid-Open No. 2008-187688

Non Patent Literature

1. Internet URL http://www.placeengine.com (searched Oct. 1, 2008)
2. Jun Rekimoto, Takashi Miyaki, and Takaaki Ishizawa, "Lifetag: WiFi-based Continuous Location Logging for Life Pattern Analysis", 3$^{rd}$ International Symposium Location- and Context-Awareness (LOCA2007), pp. 35-49, 2007
3. Internet URL http://www.locky.jp (searched Oct. 1, 2008)
4. Seigo Ito, Hiroshi Yoshida, Nobuo Kawaguchi, "Examination of Broad Area Positional Information System using Wireless LAN", Information Processing Society of Japan, PSJ Journal, Special Issue for Mobile Communication and High-Speed Traffic System supporting Ubiquitous Era, Vol. 47, No. 12, pp. 1-13, 2006.

The invention claimed is:

1. A communication terminal device including a communication unit which can be connected at least to a wireless communication network and capable of executing application programs using communication, the communication terminal device comprising:
   a communication quality information acquisition mechanism provided with:
      a connection base station information acquisition unit acquiring identification information for a base station in a connected communication network;
      an application execution unit performing execution processing of the application program;
      an application detection unit detecting a type or name of the application program currently running;
      a communication quality acquisition unit acquiring information regarding communication quality including whether or not communication can be made in an application program currently running, and including differences in level of service among base stations with which said communication can be made, the differences in level of service including at least two of jitter, loss, and throughput; and
      a communication quality information recording unit recording a combination of at least a current location of the communication terminal device, identification information for the base station, a type or name of the application program, and communication quality information in a communication quality database; and
   a base station selection mechanism provided with:
      the application execution unit;
      the application detection unit; and
      a base station selection unit which inputs a type or name of an application program currently running detected by the application detection unit, refers to the communication quality database, and selects identification information for a base station whose communication quality information is optimal with respect to the currently running application program, wherein when the communication terminal device selects a base station to be connected, connection is made with the base station in accordance with the selection by the base station selection mechanism; and
   wherein the application detection unit detects the type or name of the application program by monitoring packets passing through the communication quality information recording unit and comparing that packet mode with a database of packet modes for each application program prepared in advance.

2. A communication terminal device according to claim 1, wherein the communication quality information acquisition mechanism is provided with a location detection unit detecting a current location of the communication terminal device;
   the communication quality information recording unit records a location of the communication terminal device in a combination of identification information for the base station, the type or name of the application program, and communication quality information in the communication quality database;
   the base station selection mechanism is provided with the location detection unit; and
   the base station selection unit inputs the current location detected by the location detection unit and the type or name of an application program currently running detected by the application detection unit, refers to the communication quality database, and selects identification information for a base station whose communication quality information is optimal with respect to the currently running application program.

3. A communication terminal device according to claim 2, wherein the location detection unit is provided with:
   a simultaneous detection base station information acquisition unit acquiring identification information for a plurality of base stations which can be simultaneously detected; and
   a location specification unit specifying a location of the communication terminal device in accordance with distribution information for base stations prepared in advance.

4. A communication terminal device according to claim 3, wherein the simultaneous detection base station information acquisition unit measures radio-wave intensity of each base station together with the identification information for a base station; and
   the location specification unit calculates a location using the radio-wave intensity.

5. A communication terminal device including a communication unit which can be connected at least to a wireless communication network and capable of executing application programs using communication, wherein
   the communication quality database according to claim 1 or claim 2 is provided in advance;
   the base station selection mechanism according to claim 1 or claim 2 is provided; and
   when a connection destination base station is selected, the communication terminal device connects with a base station in accordance with a selection by the base station selection mechanism.

6. A communication system including a terminal device provided with a communication unit which can be connected at least to a wireless communication network and capable of executing application programs using communication and a server device notifying a base station to be connected to the terminal device through a communication network, the terminal device comprising:
   a communication quality information transmission mechanism provided with:
      a connection base station information acquisition unit acquiring identification information for a base station in a connected communication network;

an application execution unit performing execution processing of the application program;
an application detection unit detecting a type or name of the application program currently running;
a communication quality acquisition unit acquiring information regarding communication quality including whether or not communication can be made in an application program currently running, and including differences in level of service among base stations with which said communication can be made, the differences in level of service including at least two of jitter, loss, and throughput; and
a communication quality information transmission unit transmitting each of at least identification information for the base station, a type or name of the application program, and the communication quality information to the server device; and
a base station reference processing mechanism provided with:
the application execution unit;
the application detection unit; and
a base station reference unit transmitting a type or name of an application program currently running detected by the application detection unit to the server device and receiving identification information for a base station to be selected from the server device; and
the server device comprising:
a communication quality information recording mechanism provided with:
  a communication quality information reception unit receiving various types of information from the communication quality information transmission unit through a communication network; and
  a communication quality information recording unit recording a combination of the various types of information in a communication quality database; and
a base station response processing mechanism provided with:
  a base station selection unit which inputs information received from the base station reference unit, refers to the communication quality database, and selects identification information for a base station whose communication quality information is optimal with respect to the currently running application program; and
  a base station response unit transmitting identification information for the selected base station to the terminal device, wherein
when the terminal device selects a base station to be connected, connection is made with the base station in accordance with the selection by the sever device; and
wherein the application detection unit detects the type or name of the application program by monitoring packets passing through the communication quality information recording unit and comparing that packet mode with a database of packet modes for each application program prepared in advance.

7. A communication system according to claim 6, wherein
the communication quality information transmission mechanism of the terminal device is provided with a location detection unit detecting a current location of the communication terminal device;
the communication quality information transmission unit transmits the location of the communication terminal device in a combination of identification information for the base station, the type or name of the application program, and the communication quality information to the server device;
the base station reference processing mechanism is provided with the location detection unit;
the base station reference unit transmits the current location detected by the location detection unit and the type or name of the currently running application program detected by the application detection unit to the server device;
the base station selection unit in the server device inputs information including the current location, refers to the communication quality database, and selects identification information for a base station whose communication quality information is optimal with respect to the currently running application program.

8. A communication system according to claim 7, wherein
the location detection unit in the terminal device is provided with a simultaneous detection base station information acquisition unit acquiring identification information for a plurality of base stations which can be simultaneously detected; and
a location specification unit specifying a location of the communication terminal device in accordance with distribution information for base stations prepared in advance.

9. A communication system according to claim 8, wherein
the simultaneous detection base station information acquisition unit measures radio-wave intensity of each base station together with the identification information for a base station; and
the location specification unit calculates a location using the radio-wave intensity.

10. A terminal device including a communication unit which can be connected at least to a wireless communication network and capable of executing application programs using communication, the terminal device comprising
the base station reference processing mechanism according to claim 6 or 7, wherein
when a connection destination base station is selected, the terminal device connects with a base station in accordance with a selection by the server device.

11. A selection method for a base station in a communication terminal device including a communication unit which can be connected at least to a wireless communication network and capable of executing application programs using communication, the method including a series of processes for preparing a communication quality database, the series including:
a step in which an application execution unit performing execution processing of the application program;
during the execution processing of the application program, a step in which an application detection unit detects a type or name of the application program currently running;
a step in which a location detection unit detects a current location of the communication terminal device;
a step in which a connection base station information acquisition unit acquires identification information for a base station in a connected communication network;
a step in which a communication quality acquisition unit acquires information regarding communication quality including whether or not communication can be made in an application program currently running, and including differences in level of service among base stations with which said communication can be made, the differences in level of service including at least two of jitter, loss, and throughput, each of the steps being executed and processed simultaneously or in an appropriate sequence; and thereafter a step in which a communication quality information recording unit records at least a combination of the location of the communication terminal device, identification information for the base station, the type or name of the application program, and communication quality information in a communication quality database; and a series of processes in which the communication terminal device connects to a base station in accordance with the selection by the base station selection mechanism, when a connection destination base station is to be selected, the series including:

a step in which an application execution unit performs execution processing of the application program;

during the execution processing of the application program, a step in which an application detection unit detects a type or name of the application program currently running, wherein the application detection unit detects the type or name of the application program by monitoring packets passing through the communication quality information recording unit and comparing that packet mode with a database of packet modes for each application program prepared in advance;

a step in which a location detection unit detects a current location of the communication terminal device, each of the steps being executed and processed simultaneously or in an appropriate sequence; and thereafter the base station selection unit inputs the detected current location and the type or name of the currently running application program, refers to the communication quality database prepared as above, and selects identification information for a base station whose communication quality information is optimal with respect to the currently running application program.

12. A selection method for a base station in a communication system, the system including a terminal device including a communication unit which can be connected at least to a wireless communication network and capable of executing application programs using communication and a server device notifying a base station to be connected to the terminal device through a communication network, the method including a series of processes for preparing a communication quality database, the series including, in the terminal device:

a step in which an application execution unit performs execution processing of the application program;

during the execution processing of the application program, a step in which an application detection unit detects a type or name of the application program currently running;

a step in which a location detection unit detects a current location of the terminal device;

a step in which a connection base station information acquisition unit acquires identification information for a base station in a connected communication network;

a step in which a communication quality acquisition unit acquires information regarding communication quality including whether or not communication can be made in an application program currently running, and including differences in level of service among base stations with which said communication can be made, the differences in level of service including at least two of jitter, loss, and throughput, each of the steps being executed and processed simultaneously or in an appropriate sequence; and thereafter a step in which a communication quality information transmission unit transmits at least each of the location of the terminal device, identification information for the base station, the type or name of the application program, and the communication quality information to the server device;

in the server device, a step in which a communication quality information reception unit receives each of information from the communication quality information transmission unit through a communication network; and a step in which a communication quality information recording unit records a combination of each of the information in a communication quality database; and a series of processes in which the terminal device connects to a base station in accordance with the selection by the server device, when a connection destination base station is to be selected, the series including, in the terminal device:

a step in which an application execution unit performs execution processing of the application program;

during the execution processing of the application program, a step in which an application detection unit detects a type or name of the application program currently running, wherein the application detection unit detects the type or name of the application program by monitoring packets passing through the communication quality information recording unit and comparing that packet mode with a database of packet modes for each application program prepared in advance;

a step in which a location detection unit detects a current location of the terminal device, each step being executed and processed simultaneously or in an appropriate sequence; and thereafter a step in which a base station reference unit transmits the detected current location and the type or name of the currently running application program to the server device; and in the server device, a step in which a base station selection unit inputs information received from the base station reference unit, refers to the communication quality database, and selects identification information for a base station whose communication quality information is optimal with respect to the currently running application program;

a step in which a base station response unit transmits identification information for the selected base station to the terminal device; and a step in which the base station reference unit of the terminal device receives identification information for the selected base station.

* * * * *